(12) United States Patent
Partanen et al.

(10) Patent No.: US 6,532,100 B1
(45) Date of Patent: Mar. 11, 2003

(54) EXTENDED LIFETIME FREQUENCY CONVERSION CRYSTALS

(75) Inventors: Jouni P. Partanen, Los Angeles, CA (US); Xingkun Wu, Painted Post, NY (US); Gary Reynolds, Santa Clarita, CA (US); William F. Hug, Pasadena, CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/368,342

(22) Filed: Aug. 4, 1999

(51) Int. Cl.⁷ .............................. G02F 1/35; H01S 3/108
(52) U.S. Cl. ......................................... 359/326; 372/21
(58) Field of Search ................................ 359/326–332; 372/21, 22

(56) References Cited

U.S. PATENT DOCUMENTS

| | | | |
|---|---|---|---|
| 4,346,314 A | 8/1982 | Craxton | 359/329 |
| 4,510,402 A | 4/1985 | Summers et al. | 359/329 |
| 4,575,330 A | 3/1986 | Hull | 425/174.4 |
| 4,826,283 A | 5/1989 | Chuangtian et al. | 385/122 |
| 4,575,330 A | 12/1989 | Hull | 425/174.4 |
| 5,182,715 A | 1/1993 | Vorgitch et al. | 700/182 |
| 5,184,307 A | 2/1993 | Hull et al. | 700/182 |
| 5,840,239 A | 11/1998 | Partanen et al. | 264/401 |
| 6,002,697 A | * 12/1999 | Govorkov et al. | 372/22 X |
| 6,036,321 A | * 3/2000 | Wright et al. | 359/513 |

OTHER PUBLICATIONS

Gitin, Mark, "UV Lasers: State of the Art Is All–Solid–State," *Phototonics Spectra*, Sep. 1998, pp. 136–139.

* cited by examiner

Primary Examiner—John D. Lee
(74) Attorney, Agent, or Firm—Willaim H. Wright; Ralph D'Alessandro (57) ABSTRACT

Solid state lasers that use non-linear optical crystals to generate frequency tripled or quadrupled output in the ultraviolet have low lifetimes due to damage to the face of the non-linear crystal through which the ultraviolet signal exits. To prevent this damage, the tripling or quadrupling crystal is provided within a controlled environment that is maintained substantially free from contaminants such as silicon-bearing and organic compounds. The tripling or quadrupling crystal is enclosed within a tubular chamber with windows on the ends of the tube that provide optical access to the entrance and exit faces of the tripling or quadrupling crystal. All heating elements and alignment elements for the crystal are outside of the chamber. Because the crystal is stored within the hermetically sealed chamber, contaminants are not available within the environment of the crystal that could interact with the energetic photons of the ultraviolet output of the frequency multiplied solid state laser. The windows and walls of the chamber are preferably made of materials that can be cleaned effectively, such as sapphire or quartz for the windows and stainless steel for the walls and flanges of the chamber.

52 Claims, 3 Drawing Sheets

EXTENDED LIFETIME FREQUENCY CONVERSION CRYSTALS

BACKGROUND OF THE INVENTION

1. Field of the Invention

The present invention relates to the frequency conversion of optical signals by nonlinear optical crystals and to laser systems that provide short-wavelength, frequency-multiplied outputs using such nonlinear optical crystals.

2. Description of the Related Art

Intense ultraviolet light sources can be used in a variety of different applications. For example, photolithography presently uses excimer lasers as light sources to take advantage of the intensity and narrow line width of excimer lasers to define features on semiconductor devices having widths of one quarter micron or smaller. Micro-machining applications use intense ultraviolet light sources, taking advantage of the flux of high-energy photons to efficiently machine fine structural details in objects. Photochemical applications can also use intense short-wavelength light sources to great advantage, because short wavelength or high-energy photons are particularly effective in driving certain types of photochemical reactions. All of these applications benefit from the use of high-intensity, short-wavelength light sources but to date the available light sources are not entirely satisfactory.

There are comparatively few light sources capable of outputting significant levels of optical output in the ultraviolet. Mercury lamps are a traditional short wavelength light source that has become increasingly inadequate for demanding or high intensity applications. Helium-cadmium and hollow cathode lasers can provide ultraviolet output, but with insufficient intensity for many applications. Excimer lasers are used in photolithography, but excimer lasers are large, expensive, and have poor beam quality. Perhaps the most significant limitation of excimer lasers for some applications, however, is the relatively low pulse rate of the laser. Typical excimer laser systems have a pulse rate on the order of one thousand Hertz, which can be disadvantageous.

Another possible ultraviolet light source is a frequency tripled or quadrupled solid state laser. The fundamental output of a solid state laser system such as Nd:YAG or Nd:YVO$_4$ is at a wavelength of approximately 1.064 $\mu$m. The frequency tripled or quadrupled output of such a solid state laser is thus in the ultraviolet, offering wavelengths of 355 nm (tripled) or 266 nm (quadrupled). Frequency multiplied laser systems are relatively complex. On the other hand, solid state laser systems have advantages compared to other intense ultraviolet light sources, making frequency multiplied solid state lasers desirable for at least some applications. The advantages of solid state lasers include excellent beam quality, relatively small size, good efficiency and the availability of high repetition rates. The reasons for certain of these advantages are discussed here to provide a better background for understanding certain aspects of the present invention.

Solid state lasers are a class of lasers that use as a gain medium a crystalline, glass or other solid material that serves as a host for an optically excitable material such as an ion of a rare earth element like neodymium. The crystalline, glass or other solid host material acts as a matrix fixing the optically excitable material in place. Examples of solid state laser systems include those that use neodymium as the excitable material within a matrix of yttrium aluminum garnet (Nd:YAG) or neodymium within a matrix of yttrium vanadate (Nd:YVO$_4$) as the respective gain media of the solid state lasers. Pump sources for these solid state laser systems include broad band light sources such as xenon or other types of flash lamps. Often, however, the pump source for the solid state laser system is a diode laser or, more preferably, an array of diode lasers. Broad band flash lamp pumping can be inefficient because the pump light cannot be well focused into the gain region and because the spectrum of the light is so broad that light is absorbed that does not facilitate pumping of the gain medium and instead merely heats the gain medium. An alternative to broadband pump sources is the use of semiconductor laser diodes, including monolithic linear arrays of semiconductor lasers. Laser diode pump sources can be selected that output light at a wavelength closely matched to the gap between excitation levels within the gain medium. Such a matched pump source can efficiently pump the gain medium. Some solid state lasers utilize diode lasers to pump the solid state gain medium in an "end-pumped" configuration in which the gain medium has its longest dimension extending along the optical axis of the laser cavity and the diode laser pump light is introduced through an end face of the gain medium. This end pumped configuration can capture a relatively high portion of the input laser diode pump light to provide an efficient laser. Side pumped configurations of solid state lasers provide laser diode array pump sources along the sides of a solid state laser. In this configuration, it is typical to direct the output of the pump diode lasers generally perpendicular to the optical axis of the solid state laser and into the gain medium. Often, side pumped configurations capture less of the pump light but use simpler optics to couple the pump light into the gain medium. Nd:YVO$_4$ has a very high absorption coefficient at the most favorable wavelengths for efficiently pumping the Nd:YVO$_4$ gain medium. Solid state lasers using Nd:YVO$_4$ as a gain medium may be configured as end pumped lasers or as side pumped lasers.

Figure 1:
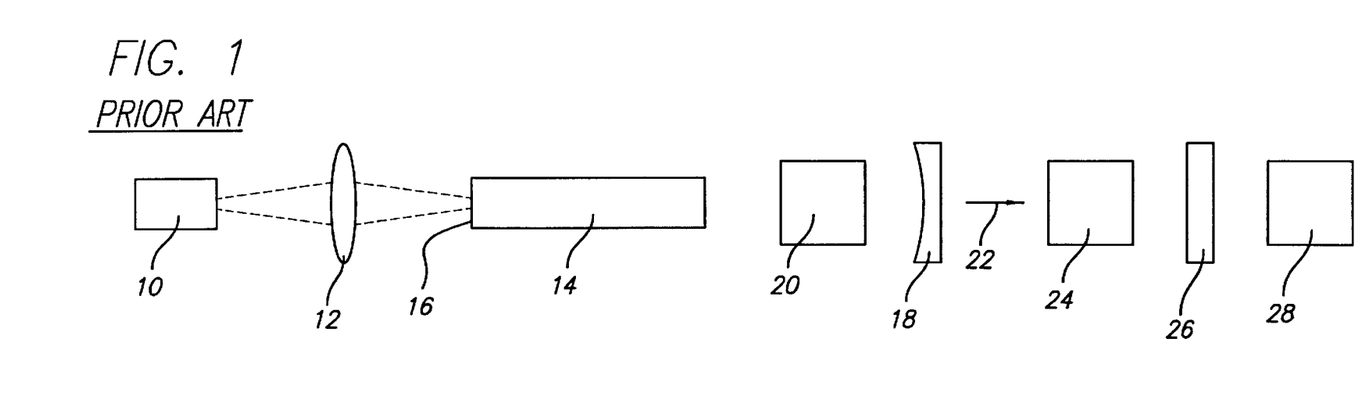
FIG. 1 illustrates a conventional configuration of a laser system in which the fundamental frequency of a solid state laser is tripled for output in the ultraviolet.

FIG. 1 shows a frequency-tripled solid state laser and provides a useful illustration of several of the concepts involved in such a system. A laser diode array 10 provides pump light at a wavelength appropriate to efficiently pump the solid state gain medium and the pump light is collected and focused by a lens 12 into the gain medium 14. The gain medium in this end pumped configuration might be, for example, Nd:YAG, Nd:YVO$_4$ or another gain medium. A coating, highly reflective at the fundamental output of the laser (1.06 $\mu$m) but transmissive of the pump radiation, is deposited on one end face 16 of the gain medium 14 to serve as the high reflecting mirror for the laser cavity. Alternately, the high reflector might be a freestanding mirror transmissive at the pump wavelength but highly reflective at the fundamental wavelength of the solid state laser. Output coupler 18 defines the other end of the resonant cavity. A Q-switch 20 may be provided within the resonant cavity to provide increased levels of peak output power in pulsed mode operation.

Light 22 at a wavelength of approximately 1.06 $\mu$m exits the resonant cavity through the output coupler 18 and is directed into a first nonlinear optical crystal, doubling crystal 24. In this illustration, doubling crystal 24 might be KDP (potassium dihydrogen phosphate) configured in accordance with conventional type II phase matching conditions. It may be desirable to polarize the fundamental output of the gain medium if, for example, Nd:YAG is used as the gain medium 14. On the other hand, if Nd:YVO$_4$ is used as the gain medium 14, it may be unnecessary to provide a polarizer, since Nd:YVO$_4$ typically provides a polarized output. The output of the doubling crystal 24 is typically chosen to include light of the fundamental frequency and light of the doubled frequency. The two output light signals are passed through a rotation element 26 that adjusts the relative polarization between the two light beams to provide the desired relationship between the polarizations of the two light beams for the tripling crystal. From the rotation element 26, the beams of fundamental and doubled light are provided into the second nonlinear optical crystal, tripling crystal 28. The tripling crystal may also be KDP operated under type II phase matching conditions.

Photons from the fundamental beam and the frequency-doubled beam are combined in the tripling crystal to provide an optical output signal at a frequency tripled from the fundamental output of the solid state gain medium 14. This frequency-tripled output may be at a wavelength of approximately 355 nm. It should be noted that the laser gain medium may be approximately one centimeter in length and the optical path length between the lens 12 and the output coupler 18 may be as small as approximately 5 to 15 cm. Consequently, these lasers may be quite compact. In addition, these frequency-tripled lasers can have good efficiency and good optical characteristics such as beam quality. As such, they are useful for a variety of applications. The illustrated optical configuration may be modified to achieve different performance characteristics. For example, the doubling crystal 24 and tripling crystal 28 can be placed within the laser cavity itself to increase the efficiency of the tripling operation.

One difficulty that has been observed for frequency-tripled, solid state lasers is a relatively low lifetime that is unacceptable for many practical applications. The shortened lifetime correlates with damage at the output face of the frequency tripling crystal and normal, frequency-tripled operation of the laser can be recovered by replacing the tripling crystal. Alternately, normal frequency-tripled laser operation can be obtained by moving the tripling crystal so that the optical path of the laser passes through a different, non-damaged portion of the tripling crystal. The strategy of moving the tripling crystal to extend the useful life of the frequency-tripled laser has been automated in a commercial laser marketed by Coherent, Inc.

Another attempt at increasing the short lifetime of frequency-tripled lasers has been to enclose sub-assemblies of the laser and to seal the sub-assemblies from the environment. One of the laser sub-assemblies that has been enclosed includes the doubling and tripling crystals, along with the optics, electronics and alignment structures necessary to use the doubling and tripling crystals within a laser system. For example, the frequency multiplying crystals 24, 28, the optical element 26, one or more heaters for the doubling and tripling crystals, as necessary, along with the wires for the heaters, and the rotational and translational alignment elements for the optical elements might all be provided within a single enclosure. Generally, the optical sub-assembly is aligned and optimized, and then the assembly is sealed within the enclosure. The optical fixtures such as rotational and translational alignment elements typically include lubricants and may not be amenable to effective cleaning techniques, such as those that include baking. The electrical lines for the heaters or other elements within the enclosure connected to the outside through wires generally must be fed through the walls of the enclosure. Seals and electronic feed-throughs that pass through the walls of the enclosure may include vacuum grease or potting compounds. This enclosure strategy has also not been successful in satisfactorily extending the normal lifetime of a frequency-tripled solid-state laser.

SUMMARY OF THE PREFERRED EMBODIMENTS

An aspect of the present invention provides a laser system including a solid state laser producing a fundamental laser output at a fundamental wavelength. A frequency conversion crystal is disposed along an optical path leading from the solid state laser. The frequency conversion crystal receives light and outputs light at a second wavelength different from the fundamental wavelength. A chamber encloses at least a portion of an exit face of the frequency conversion crystal within an environment hermetically sealed from an environment outside of the chamber. In a particularly preferred aspect of certain embodiments of the present invention, only elements that can be well-cleaned are positioned within the hermetically-sealed chamber.

Another aspect of the present invention provides a method for producing a laser system including providing a mounting fixture and a chamber adapted for holding the mounting fixture. The method proceeds by cleaning the mounting fixture and the chamber and cleaning at least a surface of a frequency conversion crystal to be protected by the chamber. The frequency conversion crystal, the mounting fixture and the chamber are assembled and the chamber is sealed to enclose the surface of the frequency conversion crystal to be protected by the chamber. For certain preferred embodiments, the final alignment of the conversion crystal most preferably is done after the crystal has been hermetically sealed.

Still another aspect of the present invention provides a method for replacing a frequency conversion crystal in a laser system. A laser system that uses a frequency conversion crystal to generate light of a converted wavelength is provided and the frequency conversion crystal is removed from the laser system. A new frequency conversion crystal is installed into the laser system, wherein the new frequency conversion crystal has at least one surface maintained in a hermetically sealed environment prior to and throughout installation.

Another aspect of the invention provides a method for replacing a frequency multiplying crystal in a commercial laser system, where the replacing occurs within an environment in which the commercial laser system operates.

DETAILED DESCRIPTION OF THE PREFERRED EMBODIMENTS

The present invention is made in view of observations regarding possible mechanisms underlying the shortened lifetime of frequency conversion crystals that generate ultraviolet light output in solid state and other laser systems. Certain preferred embodiments of the present invention enclose at least a portion of the exit face of a frequency conversion within a hermetically-sealed chamber. Most preferably, such preferred embodiments ensure that only elements that are well-cleaned are positioned within the hermetically-sealed chamber. Certain elements such as conventional insulated wires and conventional translation and rotation stages are considered incompatible with adequate cleaning. This sealed-crystal configuration is believed to reduce the level of contaminants available to participate in what is believed to be a significant damage mechanism for frequency conversion crystals that produce significant levels of ultraviolet output.

Other implementations of the present invention provide frequency conversion crystals in laser systems. Certain of the methods preferably proceed by cleaning a chamber that accepts a mounting fixture for holding a frequency conversion crystal within the chamber which in turn is mounted in the laser system. The frequency conversion crystal, the mounting fixture and the chamber are assembled and the chamber is sealed to enclose at least a portion of an exit surface of the frequency conversion crystal. Alignment of the frequency conversion crystal is accomplished by adjusting the position of the chamber, so that the final alignment of the conversion crystal can be done after the crystal has been sealed within the chamber. This method makes it possible to keep alignment elements away from the frequency conversion crystal so that lubricants typically used in such alignment elements are not available as contaminants.

FIG. 1 illustrates a conventional solid-state laser system in which the infrared output of the solid state laser is first doubled in a second harmonic generation crystal, which is the first conversion crystal in the laser system. The frequency doubled laser light and a portion of the original frequency, fundamental output is provided to a tripling crystal 28 which outputs light with a frequency three times the frequency of the fundamental frequency and which is the desired ultraviolet output. Tripling crystal 28 is the second frequency conversion crystal in the FIG. 1 laser system and might also be referred to as a third harmonic crystal.

For high levels of ultraviolet power output from the FIG. 1 system, the ultraviolet light exiting the third harmonic crystal 28 appears to damage or mediates damage to the output face of the third harmonic crystal. The observed damage is limited in scope essentially to the spot size of the beams leaving the crystal, which typically is on the order of one hundred microns in diameter but can vary greatly in different systems. The position of the damage at the ultraviolet beam exit necessarily interferes with the output beam quality and intensity. Even though the damage is limited in extent, the damage is nonetheless significant to the performance of the laser. This damage to the output face of the tripling crystal significantly reduces the lifetime of laser systems like that illustrated in FIG. 1 and is a significant barrier to the use of tripled or quadrupled solid state lasers as ultraviolet light sources.

The present inventors have observed that the damage to the output face of the tripling crystal occurs at the output face of the crystal and that the damage is highly localized near the position where the laser beams leave the crystal. As such, it is very likely that the damage is associated with the presence of 355 nanometer photons (tripled frequency, ultraviolet) at the output face of the crystal. This effect seems to be driven primarily by the high-energy photons present at the output face and by the energy density of those photons present at the output face of the tripling crystal. If the damage occurred simply from the energy density of any wavelength photons at the face of the crystal, then damage would be as likely to occur at the entrance and exit faces of the doubling crystal and the entrance face to the tripling crystal. However, those surfaces do not generally show as serious of a damage problem.

Microscopic analysis of the damaged exit face of a tripling crystal reveals mounding near the damaged exit path. Auger analysis of the mounds adjacent the damage identifies the mounds as including silicates that likely derive from the presence of volatile silicon-bearing compounds near the exit face of the tripling crystal. No mounding or plating phenomenon of similar extent is observed on the faces of the doubling crystal or the entrance face of the tripling crystal. As such, it appears that the damage to the exit face of the tripling crystal relates to a chemical reaction driven by the high energy of the frequency-tripled, ultraviolet photons. The precise mechanism that causes the damage to the tripling crystal is unclear, but it seems probable that the triggering or initiating event relates to the interaction between the tripled photons and the environment adjacent the exit face of the tripling crystal. Consequently, the present inventors have sought to reduce the damage to the exit face of the tripling crystal by reducing the level of volatile chemicals that are available to interact with the tripled photon output that exit the tripling crystal. More precisely, preferred embodiments of the present invention limit the level of volatile organics, silicon-bearing compounds and other potentially damaging chemicals that are within the environment of the face of the frequency multiplication crystal from which ultraviolet photons exit. While this discussion is primarily made in terms of the use of a tripling crystal, it should be appreciated that the described phenomena and solutions are believed to be similarly applicable to quadrupling crystals or other optical structures that generate high densities of ultraviolet light output.

To limit the presence of potentially damaging chemicals at the exit face of a frequency multiplication crystal, preferred embodiments of the present invention seal the frequency multiplication crystal within a controlled environment that is maintained substantially free from contaminants. For example, the tripling or other frequency multiplication crystal may be enclosed within a chamber provided with windows that provide optical access to the entrance and exit faces of the frequency multiplication crystal. Alternately, a chamber may be provided that seals only the exit face of the frequency multiplication crystal or a portion of the exit face. Preferably, the chamber provides an effective seal or containment around the frequency multiplication crystal, protecting at least a portion of the exit face of the crystal from environmental contaminants. Particularly preferred embodiments of the invention provide a chamber that hermetically encloses at least the UV exit face of the frequency multiplication crystal. The windows and walls of the chamber are preferably made of materials that can be cleaned effectively, such as sapphire, fused silica or quartz for the windows and stainless steel for the walls of the chamber. These materials are particularly suitable because they can be baked, including within a vacuum furnace if desired, to effectively remove volatile compounds from the windows and walls of the chamber. Suitable materials for the inner surfaces of the chamber preferably are substantially non-porous, or at least effectively so within the time periods involved, and suitable preferred designs for the chamber avoid spaces that could readily trap gas.

Figures 2, 3:
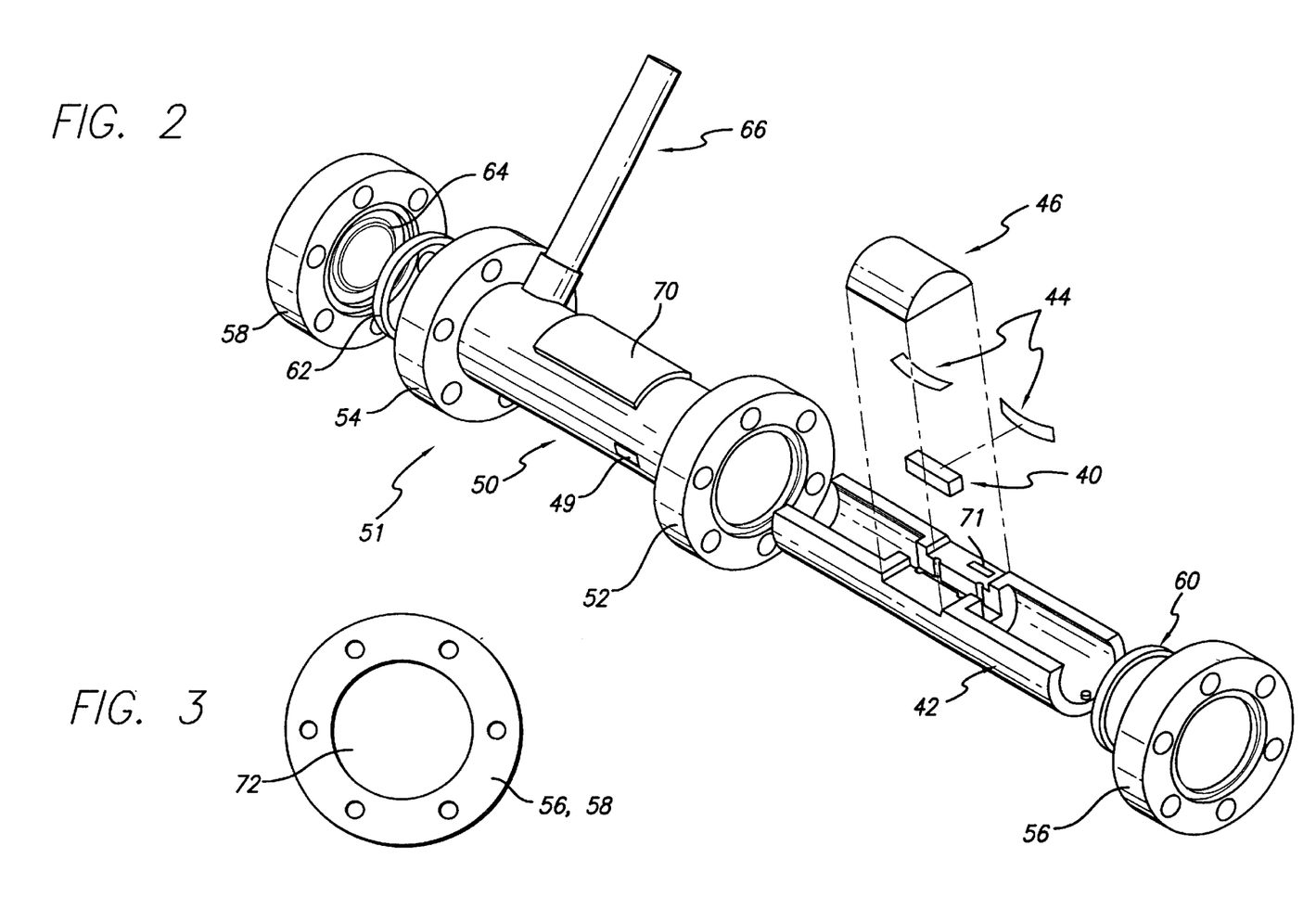
FIG. 2 is an assembly drawing of a chamber in accordance with a preferred embodiment of the present invention.
FIG. 3 illustrates an end view of a flange with a window in place.

An embodiment of a preferred chamber is illustrated in FIG. 2, which shows a tripling or quadrupling crystal 40 and mounting fixtures for providing the crystal within the chamber assembly 51. Crystal 40 is mounted within a copper holder 42 that serves as a temperature stabilizing thermal reservoir when the crystal 40 is in use. The copper holder has a machined fixture that provides at least one mounting surface for the crystal 40. A well defined mounting surface provides a consistent mounting position for the crystal 40, which can be useful for the alignment and stability of the overall laser system. Stainless steel retainers 44 provide a resilient holding force to hold the crystal in its defined position with respect to the copper holder 42. The holder and thermal environment of the frequency conversion crystal 40 are completed by a copper cap 46 that fits onto the copper holder 42 to cover the crystal 40. Most preferably, this assembly holds the tripling or other frequency conversion crystal 40 in a stable relation to the walls of the chamber through the crystal's normal use, including through an expected range of thermal fluctuations, so that most if not all of the alignment operations for the crystal can be made by manipulating the position of the chamber.

The assembly 51 consisting of the crystal 40 mounted between the copper holder 42 and the copper cap 46 slidably mounts within a stainless steel tube 50. On each end of the stainless steel tube is a flange 52, 54 of the type commonly available for use in vacuum applications. Matching flanges 56, 58 mate to the corresponding flanges 52, 54 on either end of the tube 50. The outer flanges 56, 58 include centrally mounted windows that provide optical access to the crystal 40. The mating sets of flanges are provided with any suitable form of connection for holding the flanges together. For example, one flange of each mating set may be threaded while the other flange of the mating set is smooth bored so that a bolt can pass through and engage the threads within the mating flange. Alternately, both flanges may be smooth bored so that the flanges are joined together with bolts and nuts. The use of such fixtures is well known in the art and so need not be discussed in great detail here. All of the flanges, like the tube 50, are preferably made from stainless steel or other material appropriate as a wall of the chamber.

A hermetic seal is most preferably established between the flanges. This may be accomplished, for example, by providing a copper gasket between each of the flanges. Most preferably, the various flanges are provided with knife edges, such as the edge 64 shown on flange 58, that embed within the respective copper gaskets when the flanges are coupled together and the bolts are tightened on the flanges to form seals. Such copper gasket seals are well known in the art and are particularly desirable in applications such as this when it is desirable to provide a hermetic seal using a material that will not outgas or otherwise produce contaminants.

Once sealed on opposite ends, the chamber assembly of tube 50, various flanges and gaskets, and frequency conversion crystal 40 may be evacuated through pump down tube 66. After evacuation, the assembly is preferably, though not necessarily, back-filled with a gas such as dry nitrogen. If desirable, the evacuation and back-filling process might be repeated several times and might be completed either with gas within the chamber or with the chamber evacuated. Preferably, the vacuum pump used in evacuating the tube is one that does not use oil or which uses a cold trap or other mechanism for avoiding oil contamination. Pump down tube 66 is then sealed. Sealing the pump down tube might be accomplished by closing a valve installed on the tube or, more preferably, by pinching off the tube to form a hermetic seal at the end of or along the tube 66. As shown in FIG. 3, each of the end flanges 56, 58 is preferably provided with a sapphire window 72 of sufficient diameter to allow for easy alignment of the frequency conversion crystal 40 with respect to the input laser beam. Most preferably, a hermetic seal is provided between each of the flanges and their respective windows.

Potential sources of contaminants preferably are not allowed within the chamber, including such sources as wire coatings, O-rings, lubricants, potting compounds, sealants and other potential contaminants including silicone-based and organic materials. In practice, maintaining separation between the exit face of the tripling or other frequency conversion crystal and contaminants requires alteration of the typical way that frequency conversion crystals are installed and used in laser systems. For some, but not all, implementations in accordance with the present invention, certain modifications preferably are made to the typical process for holding the tripling crystal at its preferred operating temperature, which is typically elevated somewhat above room temperature. Normally, heating the tripling crystal is accomplished by mounting the tripling crystal on a heater coupled to a power supply by typical wires, formed from typical materials and having an insulating coating. Preferred embodiments of the present invention avoid the presence of wire insulation within the environment of the tripling or other frequency conversion crystal that provides ultraviolet output. This may be accomplished in at least two ways. In a first variation, the frequency conversion crystal may be provided with a heater and temperature sensor within the chamber, where the heater and temperature sensor are not mounted using volatile compounds and where the leads to the heater and sensor are bare wires, at least interior to the chamber.

A second variation heats the tripling crystal and the chamber together to achieve proper temperature and heating control. For example, heating tape 70 may be provided on the outside wall 50 of the chamber and the entire chamber can be operated as an oven for maintaining the temperature of the tripling crystal at its desired level. A temperature sensor 49 is provided on the wall 50 of the chamber for detecting and controlling the temperature of the chamber as a whole. This second variation has some difficulties in that it takes longer to stabilize the tripling crystal at its desired operating temperature but is otherwise preferable in that the configuration is simpler and further avoids contaminants within the chamber. Still a third variation provides an external heater 70 as illustrated in FIG. 2, but includes a temperature sensor 71 within the chamber. The temperature sensor might, for example, be mounted within copper holder 42 with contacts made to the temperature sensor using either bare leads or using leads insulated with ceramic or another suitable insulator around the leads. In this case, a vacuum feed through for the two leads of the thermal sensor is required. For this variation, a suitable insulating material is one that does not include volatile compounds and can be baked using conventional techniques at a temperature, for example, of about 300° C. or other temperature determined to be appropriate for cleaning the chamber.

Most of the elements illustrated in FIG. 2 as being part of the chamber are readily cleaned in a process including baking. Those of ordinary skill will recognize that a wide range of baking conditions can be used to facilitate the cleaning of the chamber. For example, any temperature greater than about 50–80° C. facilitates removal of volatile compounds. Higher temperatures are generally faster. Appropriate baking conditions and techniques, and hence appropriate materials for the chamber, are chosen according to time and expense considerations, so long as the techniques are selected to ensure a desired level of frequency conversion crystal lifetime.

In assembling the chamber, then, it is preferred that most of the components are cleaned through a solvent cleaning process and baked in an evacuated oven heated to at least about 300° C. for a period of time sufficient to drive off volatile compounds. Alternately, and for certain designs preferably, the chamber is assembled and then subjected to a solvent clean and then baked. Generally the frequency conversion crystal is subjected to a solvent cleaning and a drying process before installation. At least one portion of the FIG. 2 assembly should in most cases not be baked: the frequency conversion crystal, regardless of the order of assembly and cleaning steps. Should frequency multiplication crystals other than those typically used these days become available, it is possible that the frequency multiplication crystal could be baked, as well. Other portions of the chamber might not be baked if there is a reason why those components are known to be clean. Generally this is only likely to be true for the copper gaskets.

Providing an appropriate environment within the chamber enhances the effectiveness of the chamber in preventing contamination of the surface of the ultraviolet-generating frequency conversion crystal. As a preliminary to this consideration, it is preferred that the chamber be sufficiently sealed as to provide a desirable lifetime for a tripling or quadrupling crystal within the chamber. Within the context of this application, such an appropriate seal is referenced as hermetic. It should be noted that a seal that is appropriately described as hermetic might well be different under certain circumstances. For example, a vacuum might well be an appropriate environment for enhancing the lifetime of the frequency conversion crystal. A vacuum is hard to maintain for long periods of time, possibly requiring impractical efforts to establish an appropriately hermetic seal in accordance with the present invention. On the other hand, if the chamber is filled with a gas consisting of large molecules such as $SF_6$, the gas tends not to escape from the chamber easily and so it is likely easier to establish a hermetic seal. A less exotic solution would be to place a gas such as dry nitrogen within the chamber at atmospheric pressure or above atmospheric pressure. Providing the chamber with a positive pressure, that is, providing gas to the chamber so that the chamber is at a pressure above atmospheric pressure, tends to limit the leaking of contaminants into the chamber. Regardless of the type of gas used to fill the chamber, it is preferred that the gas be functionally inert with respect to the frequency conversion crystal and the other components within the chamber over the range of operating conditions in which the chamber is used.

An acceptably hermetic seal for the chamber might be established on the basis of the tripling or quadrupling crystal remaining in operation for a time period up to at least a desired time between servicing for the laser given a desirably high level of power output and without translating the crystal. For example, the containment of the chamber might be set so that the assembly provides acceptable ultraviolet laser output for at least one thousand hours of operation without replacing or servicing the frequency conversion crystal given a high level of power output of, for example, one Watt. More preferably, the hermetic seal is established so that there are at least two thousand hours of acceptable operation without replacing or servicing the frequency conversion crystal. Most preferably, the hermetic seal is established so that there are at least five thousand hours of acceptable operation without replacing or servicing the frequency conversion crystal.

Appropriate window materials for the chamber are readily cleaned and processed through the preferred baking process and also should have good transmission properties for the input infrared and visible light beams and the output tripled, ultraviolet light beam. Both sapphire and quartz have excellent broadband transmission and both of these materials are durable and capable of baking even when mounted within the preferred stainless steel flanges used to close the tube of the chamber. Sapphire is particularly preferred because it is harder and more durable than quartz. Most preferably a vacuum tight joint, or at least a hermetic seal, is provided between the sapphire windows and the steel flanges. This may be accomplished by either a fritted seal or by brazing. Such joints are strong, can be thermally cycled and do not incorporate volatile compounds.

The exit window of the chamber might well be subject to the same chemical reaction and plating phenomenon discussed above as being responsible for the observed damage to the tripling or quadrupling crystal. It is thus possible that the exit window of the chamber could be subject to the same sort of lifetime-limiting damage, but to a lesser extent than as is observed for the ultraviolet-generating crystal. This effect may be limited to an acceptable level by spacing the exit window far enough from the ultraviolet-generating frequency conversion crystal as to reduce the power density at the exit window of the chamber to a level where little plating or little damage occurs. Because the ultraviolet beam diverges as it exits the ultraviolet-generating crystal, increasing the separation between the exit window and the ultraviolet-generating crystal expands the area on the exit window through which the ultraviolet light passes and reduces the power density at the exit window. As an example of typical divergence, the diameter of the ultraviolet beam exiting a tripling crystal may be on the order of 100 $\mu$m while the diameter of that same beam exiting the chamber window may be one millimeter or greater.

Reducing the power density at the exit window reduces the plating of silicates or other materials onto the exit window of the chamber. The separation between the ultraviolet-generating frequency conversion crystal and the exit window may be set so that the assembly provides acceptable ultraviolet output for at least one thousand hours of operation without cleaning or replacing the exit window, again presuming a desirably high level of output intensity. More preferably, the separation is set so that there are at least two thousand hours of acceptable operation without cleaning or replacing the exit window. Most preferably, the separation is set so that there are at least five thousand hours of acceptable laser operation without replacing the exit window.

Figure 4:
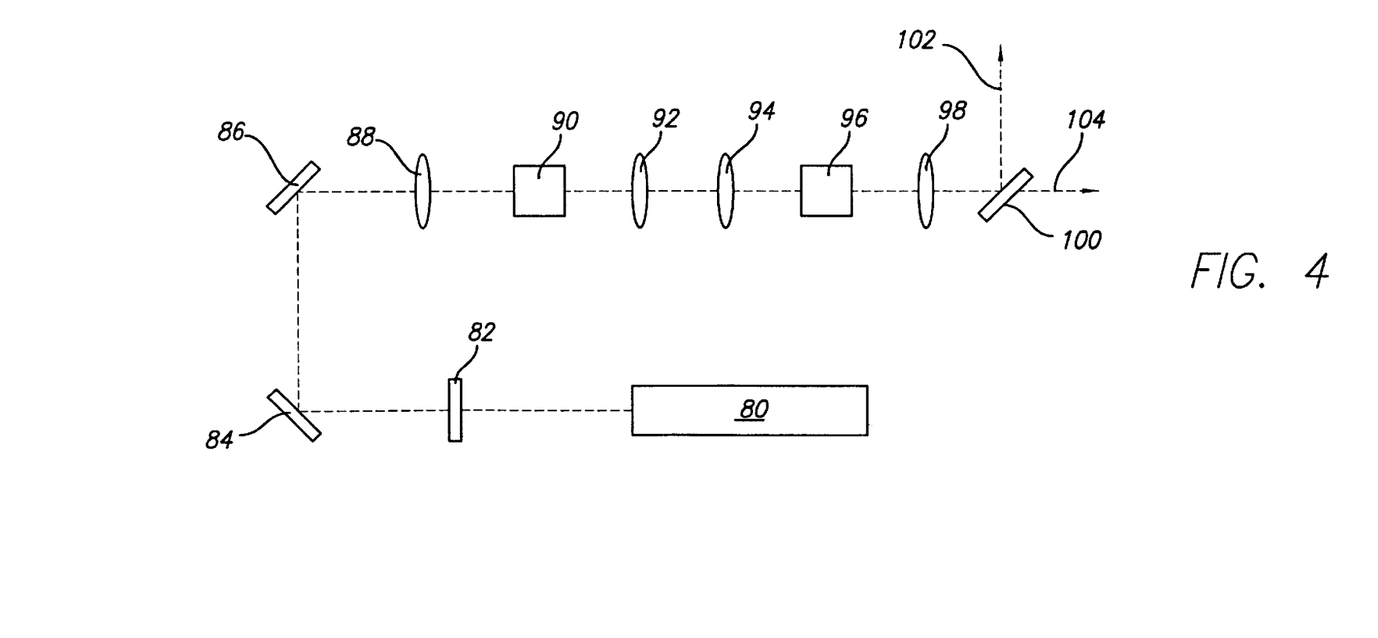
FIG. 4 illustrates an overall laser system that generates ultraviolet light using a tripling or quadrupling crystal and that provides an assembly for extending the lifetime of the ultraviolet generating, frequency conversion crystal.

Generally, a chamber or envelope containing the frequency conversion crystal in accordance with the present invention will be particularly well suited for use in laser systems that produce an output in the wavelength range of about 325 to about 360 nanometers. FIG. 4 provides a particularly preferred embodiment of such a laser system. The overall laser system illustrated in FIG. 4 produces three different wavelengths of light at different points along the optical path of the system, where the second and third wavelengths are harmonics of the first wavelength. Solid-state laser 80 outputs a fundamental wavelength of laser light, which determines the wavelengths of the second and third wavelengths (i.e., frequency doubled and tripled or quadrupled laser beams) within the optical system. Often, the solid-state laser 80 outputs a fundamental wavelength laser beam in the near infrared at a wavelength of about 1064 nanometers. The 1064 nanometer laser line is useful for a variety of reasons well known in the art, including the production of this line by exciting neodymium dopant ions within solid-state gain media and the compatibility of this laser line with pumping from semiconductor laser diodes. Operation of harmonic generation crystals within the optical system subsequently produces a frequency doubled 532 nanometer laser beam using a first conversion or a second harmonic generating (doubling) crystal and then produces a frequency tripled 355 nanometer laser beam as the ultimate and desired output from the overall optical system. It is because the 355 nanometer laser beam corresponds to a frequency three times that of the fundamental laser beam that the second conversion or tripling crystal is referred to as a tripling or a third harmonic generating crystal. Other embodiments of the invention might provide a second doubling crystal after the first doubling crystal to generate a frequency quadrupled laser beam as the output of the laser system.

The fundamental wavelength laser beam is output by the solid-state laser 80 and is first directed through a half wave plate 82, which rotates the polarization of the fundamental output beam by 90°. Inclusion of half wave plate 12 at this point along the optical path is primarily a matter of convenience in arranging the frequency conversion components within the overall optical system, particularly in obtaining an appropriate polarization of light to direct into the second harmonic generating crystal. Other polarizations might be used with other harmonic crystals. In particularly preferred embodiments of the present invention, the fundamental wavelength laser beam is linearly polarized in the horizontal direction (assuming the components in FIG. 4 are within a horizontal plane and a vertical direction is perpendicular to the plane of the drawings). Half wave plate 82 rotates the polarization to the vertical direction. The polarization-rotated beam is then reflected from a series of steering mirrors 84, 86, which redirect (i.e., fold) the optical path to provide a more compact footprint for the overall optical system and to allow the fundamental laser beam position and direction to be adjusted. The laser beam reflected from the second steering mirror 86 is then provided to a series of optical elements that effect the frequency doubling operation including a first lens 88, a second harmonic generating crystal 90, and a second lens 92. A distance of about 25 centimeters separates the first lens 88 from the output coupler of the solid-state laser 80 and the diameter of the fundamental laser beam at the first lens is approximately 2.5 millimeters.

The first lens 88 focuses the fundamental wavelength laser beam onto the second harmonic generating crystal 90 which, in a simple view, adds the energies of two photons of the fundamental wavelength light to produce a single photon twice as energetic as the photons which make up the fundamental wavelength laser beam. The single photon generated by combining two photons from the fundamental laser beam has two times the energy of the fundamental photon, has a frequency doubled from that of the fundamental photon, and has a wavelength of one-half of the fundamental laser beam's photons. This frequency doubling process is effected on a large scale within the second harmonic generating crystal 90 to produce a second beam of laser light with a doubled frequency (i.e., a "second harmonic") or a wavelength of about 532 nanometers. Such harmonic generating processes are known and possible using a number of different non-linear crystals, so long as the incident laser beam has an appropriately large amount of instantaneous power.

Particularly preferred embodiments of the present invention use lithium triborate ($LiB_3O_5$, "LBO") as the harmonic generation crystal both for the initial frequency doubling and the later frequency tripling operation within the FIG. 4 laser system. Production and aspects of the use of LBO as a frequency doubling crystal are described in U.S. Pat. No. 4,826,283, entitled "$Lib_3O_5$ Crystal and its Nonlinear Optical Devices," which patent is hereby incorporated by reference in its entirety. At this time, LBO harmonic generation crystals are commercially available and their use for doubling and tripling applications is well understood by those of ordinary skill in this art. Discussions of the use of sequential identical crystals for second and then third harmonic generation can be found in U.S. Pat. No. 4,346,314, entitled "High Power Efficient Frequency Conversion of Coherent Radiation with Nonlinear Optical Elements," and in U.S. Pat. No. 4,510,402, entitled "Optical Harmonic Generator." The teachings of each of these patents with respect to the geometries and phase matching conditions for two crystal third harmonic generation are hereby incorporated by reference. The system illustrated in FIG. 4 differs from the frequency tripling applications described in the two referenced patents at least in the use of non-critical phase matching for the first LBO crystal in the particularly preferred embodiments of the present invention illustrated by FIG. 4. Non-critical phase matching refers to the primary use of temperature to meet the phase matching conditions for second harmonic generation within the first LBO crystal. This aspect of the FIG. 4 embodiment stands in contrast to the more conventional process of obtaining careful angular alignment between the crystalline axes of the doubling crystal and the propagation direction of the input fundamental wavelength laser beam.

The chamber arrangement illustrated in FIG. 2 has particular advantage for use with an LBO crystal because LBO is slightly hygroscopic and the properties of LBO may change with variations in the water content of the crystal. By maintaining the LBO crystal within a controlled environment, the optical characteristics of the crystal can be controlled more precisely.

Non-critical phase matching conditions are preferably adopted for the input of the fundamental wavelength laser beam into the first LBO crystal to facilitate a high level of overlap between the fundamental and doubled wavelengths within the second LBO crystal (the tripling crystal). Use of non-critical phase matching conditions also minimizes the extent of walk-off between the fundamental and doubled frequency beams within the second LBO crystal in practical implementations of the optical system. In the illustrated embodiment, the non-critical phase matching condition is met by holding the first LBO crystal 90 at a temperature of about 148° C. For the preferred embodiments in which a vertically polarized fundamental laser beam is provided to the first LBO crystal, the frequency doubled light output by the first LBO crystal 90 is horizontally polarized. The portion of the fundamental wavelength laser beam transmitted through the first LBO crystal 90 remains vertically polarized.

Only a portion of the fundamental wavelength laser beam is converted into a frequency doubled laser beam in preferred implementations of the present invention. This is because the frequency summing operation accomplished by the tripling crystal requires both photons of the fundamental wavelength laser beam and of the frequency-doubled laser beam to produce frequency tripled photons. For example, it may be desirable to obtain approximately equal proportions of the fundamental wavelength photons and of the doubled frequency photons to input into the mixing operation performed by the third harmonic generating crystal. From a simple accounting perspective, that proportion would require that approximately two thirds of the energy in the fundamental wavelength laser beam input to the first LBO crystal 90 be converted into frequency doubled light. Accordingly, the fundamental wavelength laser beam is focused into the first LBO crystal 90 by the first lens 88. A portion of the fundamental (1064 nm) wavelength laser beam is converted to a frequency doubled (532 nm) laser beam and then both the fundamental and the doubled laser beams are output from the first LBO crystal. The two output beams are then collimated by the second lens 92 and directed together toward the third harmonic generating crystal. To conveniently effect the collimation of the laser beam, it is desirable to select both the first and second lenses 88, 92 to have the same focal length, for example about f=40 mm. Each of the lenses is then spaced from the center of the second harmonic generating crystal by a distance equal to the respective focal lengths of the first and second lenses. In the illustrated system, this lens assembly actually reproduces the slight divergence of the laser beam that was input to the first lens, although collimation is possible and may be desired under certain circumstances.

Next, the remaining portion of the fundamental wavelength laser beam and the frequency doubled laser beam are provided to a system of a third lens 94, a second LBO crystal that will function as a tripling crystal 96, and a fourth lens 98. The tripling crystal 96 combines the fundamental wavelength light and the previously frequency doubled light in a frequency summation operation. Most preferably, at least a portion of the exit face of the tripling crystal is enclosed within a hermetic envelope that separates that portion of the exit face from the environment. Frequency summation of the fundamental wavelength and second harmonic wavelength produces frequency tripled light having a wavelength that is a third harmonic of the fundamental wavelength of the light output by the solid-state laser 80. The ultraviolet 355 nanometer light output by the tripling crystal 96 is linearly polarized in the vertical direction in particularly preferred embodiments of the present invention. In some preferred embodiments the second LBO crystal may be designed to be held at a temperature above ambient such as, for example 50–60° C., although this value is dependent on the angle at which the second LBO crystal is held.

The light output from the tripling crystal generally includes all three wavelengths of light: fundamental light with a wavelength of about 1064 nanometers; frequency doubled light with a wavelength of about 532 nanometers; and frequency tripled light with a wavelength of about 355 nanometers. All three output beams are collimated by the fourth lens 98 and directed to an output beam splitter or harmonic separator 100. To conveniently effect the collimation of the laser beams, it is desirable to select both the third and fourth lenses 94, 98 to have the same focal length, for example about f=80 mm. Each of the lenses is then spaced from the center of the second conversion crystal by a distance equal to the respective focal lengths of the third and fourth lenses. Here again, in the illustrated embodiment, the output from the fourth lens will be slightly diverging laser beams rather than a fully collimated set of beams, although full collimation is possible and may be desirable under some circumstances. The output beam splitter 100 selects and redirects frequency tripled, 355 nanometer light 102 as the most desired output of the optical system and allows the fundamental and frequency doubled beams 104 to pass out of the system. Appropriate harmonic separators or beam splitters are commercially available.

In other embodiments, the conversion crystal 96 of the FIG. 4 embodiment might be replaced with a crystal such as beta barium boride (BBO) that can be used to generate a frequency quadrupled, fourth harmonic laser beam. Generally such a system would be useful to produce even shorter wavelengths of light, depending on the fundamental wavelength of light provided to the FIG. 4 system. Regardless of the desired tripled or quadrupled output, the optical system illustrated in FIG. 4 is advantageously implemented with a solid-state laser in accordance with particularly preferred aspects of the present invention.

Aspects of the performance of the preferred laser system of FIG. 4 are closely related to the choice of Nd:YVO$_4$ (neodymium yttrium vanadate) as the preferred solid-state gain medium. Nd:YVO$_4$ is a high-gain material capable of efficiently converting pump light to output laser light. Nd:YVO$_4$ has a high coefficient of absorption and so absorbs laser diode pump radiation in a much smaller portion of the laser gain crystal than is typical of solid-state lasers like those using Nd:YAG as a gain medium. Particular advantages of this gain medium and of other high-absorption coefficient materials are discussed in U.S. Pat. No. 5,840, 239, entitled "Apparatus and Method for Forming Three-Dimensional Objects in Stereolithography Utilizing a Laser Exposure System Having a Diode Pumped Frequency Quadrupled Solid State Laser," which discussion is hereby incorporated by reference in pertinent part. Other gain media having comparatively high-absorption coefficients might also be used, but Nd:YVO$_4$ has the advantage of having a high stimulated emission coefficient and short lifetimes for certain important excited states. Use of Nd:YVO$_4$ as the gain medium has immediate practical advantages for a pulsed laser system having a pulse repetition frequency in excess of 25 kHz and more preferably in excess of 40 kHz or higher like those of preferred embodiments of the present solid-state laser. Particularly preferred embodiments of the present invention provide a side-pumped solid-state laser, with a generally rectangular-prism shaped gain medium having relatively small (about 1.8 mm×2 mm) transverse dimensions.

Optimization of the gain medium, pumping system and other aspects of the configuration and design of a solid state laser are discussed in U.S. patent application Ser. No. 09/061,796, filed Apr. 16, 1998 and entitled "Laser with Optimized Coupling of Pump Light to a Gain Medium in a Side-Pumped Geometry," and U.S. patent application Ser. No. 09/061,797, filed Apr. 16, 1998 and entitled "Laser with Absorption Optimized Pumping of a Gain Medium."Each of these applications is incorporated by reference in its entirety for its teachings and disclosure related to the design and configuration of a solid state laser.

The assembly illustrated in FIG. 2 has particular advantages for the serviceability of the laser system shown in FIG. 4. Within the system of the FIG. 4, the tripling crystal is installed within the chamber of FIG. 2 and then the chamber is installed within the FIG. 4 laser. This means that the FIG. 2 assembly as a whole is aligned rather than just the crystal and that the mounting and adjustment stages within the FIG. 4 laser are adapted for the FIG. 2 assembly. The FIG. 2 assembly is thus changed out as a unit as well, which is a significant improvement over conventional installations of frequency multiplication crystals. Tripling and quadrupling crystals generally must be handled in a clean environment. Consequently, conventional frequency multiplied solid state lasers have poor field serviceability characteristics. Using the frequency multiplication crystals within a sealed enclosure provided by preferred aspects of the present invention provides the crystal and its chamber as a unit that can be removed from a laser in the field, replaced with another sealed unit which is installed and aligned while the laser is in the field. The replaced unit can then be transported to a clean workspace for repairs and servicing.

When the chamber and frequency conversion crystal are aligned within the laser system of FIG. 4, it is preferred that the chamber and hence the frequency conversion crystal be heated to its normal operating temperature before the crystal, in its chamber, is aligned. As such, a replacement module will be installed and roughly aligned in the system. The frequency conversion crystal will then be brought up to temperature, the solid state laser will be turned on to be incident to the frequency conversion crystal and then further, fine tuning adjustments are made to the positioning and operating temperature of the frequency conversion crystal and the chamber.

Figure 5:
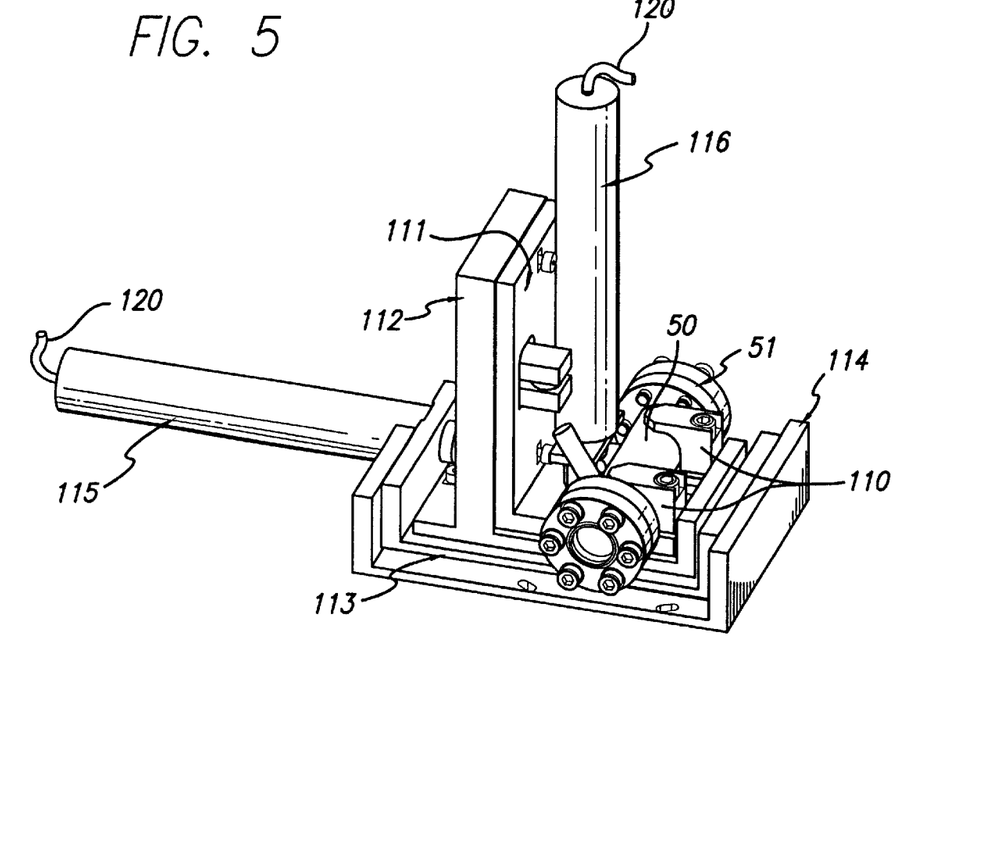
FIG. 5 illustrates a mount for the chamber of FIG. 2 in the laser system of FIG. 4.

Adjustments to the position of the frequency conversion crystal and the chamber are facilitated by using a chamber holder such as that schematically illustrated in FIG. 5. The FIG. 5 holder is adapted for operation with the chamber assembly illustrated in FIG. 2. Those of ordinary skill will of course appreciate that other configurations of holders might be used in conjunction with this and other configurations of chambers. The FIG. 5 holder includes mounting clamps 110 adapted for holding tube 50 of the FIG. 2 chamber assembly, indicated generally at 51 in FIG. 5. Clamps 110 are mounted on a Z-translation stage 111. Z-translation stage 111 is mounted on an X-translation stage 112. X-translation stage 112 is mounted on a pitch adjustment rotation stage 113, which is in turn mounted to a yaw adjustment rotation stage 114. Movement and control of the stages might be accomplished by a controller (not illustrated) coupled through cables 120 to the various actuators and translation stages. The illustrated chamber holder provides many degrees of adjustment to allow a mounted chamber to be readily aligned. Provision of an automated controller allows for fine adjustments to optimize the positioning of the chamber and the frequency conversion crystal mounted within the chamber. In addition, the chamber holder of FIG. 5 allows the position of the frequency conversion crystal to be altered. FIG. 5 shows a configuration that requires manual adjustment by an operator to align the chamber assembly 51 in the pitch and yaw rotational orientation, although remote adjustment means are readily adaptable by those of ordinary skill in the art. Actuators 115, 116 are implemented for positioning the chamber in the X and Z directions, respectively. This allows both manual adjustment by an assembly operator and remote repositioning after assembly.

The subsystem illustrated in FIG. 5 allows for the repositioning of the frequency conversion crystal with respect to the position of the laser beams at the output face of the frequency conversion crystal. For example, during an initial installation, a tripling crystal may be positioned with respect to the laser beam so that the beam passes through an initial spot. After a period of time, the tripling crystal may be moved with respect to the laser beam so that the laser beam passes through a new spot. With the laser beam exiting the tripling crystal at a position spaced from the earlier occupied position, any damage present at the earlier occupied position will not affect the repositioned beam. Since the tripling crystal is large (~2–5 mm) in comparison to the diameter (~100 μm) of the beams at the output face of the tripling crystal, many such moves can safely be made on any given crystal. Consequently, the useable life of the tripling crystal, or any similar crystal that might be damaged from exiting radiation, can be significantly extended.

The solid-state laser and frequency converted laser system described above find application in a variety of optical systems. Such laser systems are capable of outputting coherent laser radiation at wavelengths in the ultraviolet and may be useful for a range of important applications including within the field of Rapid Prototyping & Manufacturing (RP&M) and most particularly in the field of stereolithography. The present invention contemplates use of an optical system as described herein and incorporating a solid-state laser in accordance with aspects of the present invention within a stereolithographic apparatus in a manner like that described in U.S. Pat. No. 5,840,239 and entitled, "Apparatus and Method for Forming Three-Dimensional Objects in Stereolithography Utilizing a Laser Exposure System Having a Diode Pumped Frequency Quadrupled Solid State Laser," which is hereby incorporated by reference in its entirety. Of particular note in the referenced disclosure is the repetition frequency preferred to effectively use a pulsed solid-state laser in a stereolithographic apparatus as well as other design considerations for such an application. Another contemplated application of the present optical system is within the stereolithography apparatus described in U.S. patent application Ser. No. 08/847,855, filed Apr. 28, 1997, entitled "Apparatus and Method for Controlling Exposure of a Solidifiable Medium Using a Pulsed Radiation Source in Building a Three-Dimensional Object Using Stereolithography," which is hereby incorporated by reference in its entirety. Stereolithographic methods and apparatus are also described in various other U.S. patents including: (1) U.S. Pat. No. 4,575,330 to Hull; (2) U.S. Pat. No. 5,182,715 to Vorgitch; and (3) U.S. Pat. No. 5,184,307 to Hull, each of which is hereby incorporated by reference in its entirety. For the embodiments described herein that are particularly useful for stereolithographic systems such as those described in these applications and patents, it is particularly desirable that the laser beam input to the stereolithographic apparatus has an ellipticity that varies little from circular. For example, it is desirable that the laser beam input to the stereolithographic apparatus has an ellipticity of less than 1.3 and preferred that the ellipticity be less than or equal to approximately 1.1. Most typically, the input to the stereolithographic apparatus will be a frequency tripled or quadrupled laser beam.

Variations from the particular embodiment of a frequency multiplying crystal within a chamber such as that illustrated in FIG. 2 are possible within the general teachings of the present invention. For example, the present inventors have implemented aspects of the present invention by enclosing a tripling crystal within a chamber that also enclosed the heater and the pitch and yaw alignment elements for the crystal. Even though this sub-assembly included more components than might be desired in many applications of the present invention, improvements in the lifetime of the tripling crystal and of the overall laser system were expected on the basis of initial observations, although the time required to obtain actual lifetime data prevents complete lifetime data from being available at this time. Greater improvements should be obtained using the embodiment of FIG. 2, but it is possible to achieve advantages of the present invention without practicing the FIG. 2 embodiment as illustrated. It should also be noted that the variation on the invention described here provides few of the field serviceability advantages discussed with reference to the FIG. 2 enclosure.

Figure 6:
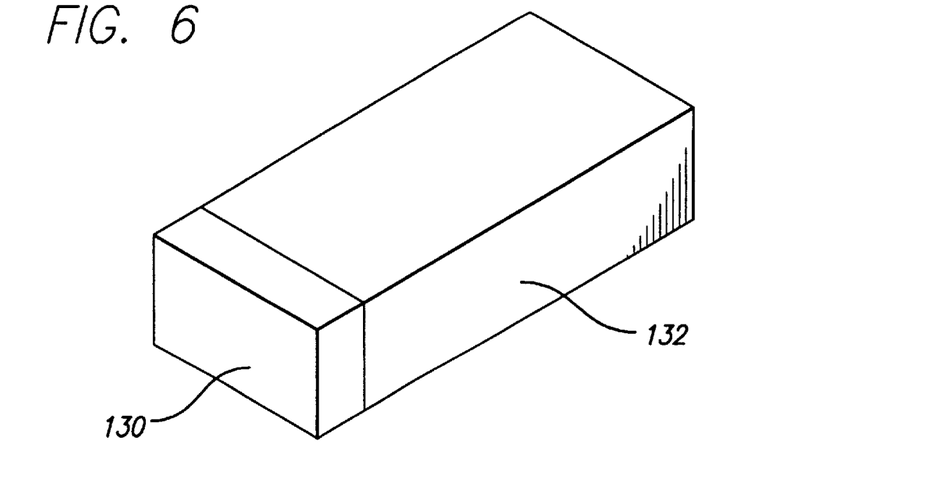
FIG. 6 illustrates a variation on an enclosure for the exit face of a tripling or quadrupling crystal.

Still another variation on the invention is illustrated in FIG. 6. This embodiment provides a sub-assembly of a tripling or quadrupling crystal that could be substituted for the tripling or quadrupling crystal 96 shown in FIG. 4. In an alternate view, the sub-assembly of FIG. 6 could be substituted for the chamber assembly 51 of FIG. 5, as long as heating and temperature elements are provided for the FIG. 6 sub-assembly. In the sub-assembly of FIG. 6, a tripling or quadrupling crystal 130 is mounted to an elongated piece of quartz 132. The elongated piece of quartz 132 is mounted to the exit face of the tripling or quadrupling crystal 130 to provide an hermetic seal over some or all of the face of the exit face of the tripling or quadrupling crystal 130. Materials other than quartz might be used if they have good ultraviolet transmission characteristics, are thermally compatible with the material of the tripling or quadrupling crystal and are mechanically strong. Most preferably, the FIG. 6 sub-assembly is mounted in a laser system such as that illustrated in FIG. 4 so that ultraviolet light leaving the exit face of the tripling or quadrupling crystal is diverging. The length of the elongated piece of quartz or other material 132 may be then set to a sufficient length to achieve a desirable reduction in the density of high energy photons at the exit face of the piece of quartz or other material 132.

In this way, the exit face of the tripling or quadrupling crystal can be protected without providing a complete enclosure. The sub-assembly of FIG. 6 has distinct advantages due to its small size and its ready compatibility with conventional laser system designs such as that illustrated in FIG. 1. On the other hand, the embodiment of FIG. 6 provides few of the field serviceability advantages discussed with reference to the FIG. 2 enclosure.

The present invention has been described in terms of certain preferred embodiments thereof. It should be appreciated, however, that these specific embodiments are provided by way of example to enhance the understanding of the present invention. Those of ordinary skill in the art will appreciate that modifications, variations and extensions of the particular embodiments described herein are possible without varying from the fundamental teachings of the present invention. As such, the present invention is not to be limited to any particular embodiment but is instead the scope of the invention that is to be determined by the claims, which follow.

What is claimed:

1. A laser system, comprising:
   a solid state laser producing a fundamental laser output at a fundamental wavelength;
   a frequency conversion crystal disposed along an optical path leading from the solid state laser, the frequency conversion crystal receiving light and outputting light at a second wavelength different from the fundamental wavelength; and
   a chamber enclosing at least a portion of an exit face of the frequency conversion crystal within an environment hermetically sealed from an environment outside of the chamber, the chamber thermally coupled to heating elements used for adjusting an operating temperature of the frequency conversion crystal, where all the heating elements are provided outside of the chamber and where the chamber is stable to baking at 300° C.

2. The laser system of claim 1, wherein the chamber is free of adjustment mechanisms usable to adjust a position of the frequency conversion crystal.

3. The laser system of claim 1, wherein all fixtures for moving or rotating the frequency conversion crystal are outside of the chamber.

4. The laser system of claim 1, further comprising a heater positioned outside of the chamber and thermally coupled to a wall of the chamber.

5. The laser system of claim 4, further comprising:
   a thermally conductive mounting block, the frequency conversion crystal mounted to the thermally conductive mounting block; and
   a temperature sensor thermally coupled to the thermally conductive mounting block.

6. The laser system of claim 4, further comprising a temperature sensor thermally coupled to a wall of the chamber.

7. The laser system of claim 6, wherein the temperature sensor is connected to the wall of the chamber.

8. The laser system of claim 1, wherein the chamber is free of insulation coated wires.

9. The laser system of claim 1, further comprising a first lens to converge light onto the frequency conversion crystal and a second lens to collect light diverging from the frequency conversion crystal.

10. The laser system of claim 9, wherein the first and the second lenses are outside of the chamber.

11. The laser system of claim 9, wherein at least one face of at least one of the first and second lenses faces on an environment within the chamber.

12. The laser system of claim 11, wherein a face of each of the first and second lenses faces on an environment within the chamber.

13. The laser system of claim 1, wherein the chamber is substantially free from organic contaminants.

14. The laser system of claim 13, wherein the chamber is sufficiently free from organic contaminants to provide over two thousand hours of operation without servicing the frequency conversion crystal.

15. The laser system of claim 13, wherein the chamber is sufficiently free from organic contaminants to provide over five thousand hours of operation without servicing the frequency conversion crystal.

16. The laser system of claim 1, wherein the chamber is sufficiently free from contaminants and sufficiently hermetically sealed to provide over one thousand hours of operation without servicing the frequency conversion crystal.

17. The laser system of claim 1, wherein the chamber is sufficiently free from contaminants and sufficiently hermetically sealed to provide over five thousand hours of operation without servicing the frequency conversion crystal.

18. The laser system of claim 1, wherein the chamber is substantially free from organic sealants.

19. The laser system of claim 1, wherein the chamber is evacuated.

20. The laser system of claim 1, wherein the chamber is filled with a functionally inert gas.

21. The laser system of claim 20, wherein the chamber is maintained at above atmospheric pressure.

22. The laser system of claim 1, wherein the second wavelength is in the range from about 325 to about 360 nanometers.

23. The laser system of claim 1, further comprising an exit window of the chamber positioned so that light of the second wavelength passes through the exit window, the frequency conversion crystal spaced from the exit window by a sufficient distance to substantially prevent plating of contaminants onto the exit window.

24. The laser system of claim 1, further comprising an exit window of the chamber positioned so that light of the second wavelength passes through the exit window, the frequency conversion crystal spaced from the exit window by a sufficient distance to substantially prevent ultraviolet light mediated damage of the exit window.

25. The laser system of claim 1, further comprising an exit window of the chamber positioned so that light of the second wavelength passes through the exit window, the frequency conversion crystal spaced from the exit window by a sufficient distance to provide at least five thousand hours of operation without replacing or servicing the exit window.

26. The laser system of claim 1, wherein the frequency conversion crystal is mounted on a translation stage so the frequency conversion crystal can be translated with respect to the optical path and wherein the frequency conversion crystal can be translated within the laser system to provide a new exit face from the frequency conversion crystal.

27. The laser system of claim 26, wherein the translation stage is translated from outside the chamber.

28. The laser system of claim 1, wherein the chamber provides an hermetic environment consisting essentially of one or more of glass, fused silica, sapphire, quartz, ceramic and metal.

29. The laser system of claim 1, wherein the chamber provides an hermetic environment consisting of inorganic materials.

30. The laser system of claim 1, wherein the second wavelength is an ultraviolet wavelength.

31. The laser system of claim 30, wherein the laser system comprises a doubling crystal and a tripling crystal.

32. The laser system of claim 1, wherein the solid state laser comprises a $Nd:YVO_4$ gain medium.

33. The laser system of claim 32, wherein the laser system comprises a stereolithography system.

34. The laser system of claim 1, further comprising a second frequency conversion crystal, wherein the second frequency conversion crystal is enclosed within the chamber.

35. The laser system of claim 1, wherein the laser system comprises a stereolithography system.

36. A method for producing a laser system, comprising:
providing a mounting fixture and a chamber adapted for holding the mounting fixture;
cleaning the mounting fixture and the chamber;
cleaning at least a surface of a frequency conversion crystal to be protected by the chamber;
assembling the frequency conversion crystal, the mounting fixture and the chamber to define an assembly and sealing the chamber to enclose the surface of the frequency conversion crystal to be protected by the chamber, providing the chamber with heating elements used for adjusting an operating temperature of the frequency conversion crystal, where all the heating elements are provided outside of the chamber and where the chamber is stable to baking at 300° C.;
providing a laser outputting light of a fundamental wavelength; and
aligning the frequency conversion crystal with respect to an optical path of the laser.

37. The method of claim 36, further comprising the step of adjusting a temperature of the frequency conversion crystal to an operation temperature prior to aligning the frequency conversion crystal.

38. The method of claim 36, further comprising filling the chamber with a gas consisting essentially of large, slow diffusing molecules.

39. The method of claim 38, wherein the gas is sulfur hexaflouride.

40. A method for producing a laser system, comprising:
providing a mounting fixture and a chamber adapted for holding the mounting fixture;
cleaning the mounting fixture and the chamber;
cleaning at least a surface of a frequency conversion crystal to be protected by the chamber;
assembling the frequency conversion crystal, the mounting fixture and the chamber to define an assembly and sealing the chamber to enclose the surface of the frequency conversion crystal to be protected by the chamber, providing the chamber with heating elements used for adjusting an operating temperature of the frequency conversion crystal, where all the heating elements are provided outside of the chamber and where the chamber is stable to baking at 300° C.; and
adjusting a temperature of the frequency conversion crystal to identify an operating temperature.

41. The method of claim 40, wherein the act of cleaning the mounting fixture and the chamber is performed before the act of assembling.

42. The method of claim 40, wherein the act of cleaning the mounting fixture and the chamber is performed after the act of assembling.

43. The method of claim 40, wherein the act of cleaning the mounting fixture and the chamber includes baking the mounting fixture and the chamber in an oven.

44. A method for producing a laser system, comprising:
providing a mounting fixture and a chamber adapted for holding the mounting fixture;
cleaning the mounting fixture and the chamber;
cleaning at least a surface of a frequency conversion crystal to be protected by the chamber;
assembling the frequency conversion crystal, the mounting fixture and the chamber to define an assembly and sealing the chamber to enclose the surface of the frequency conversion crystal to be protected by the chamber, providing the chamber with heating elements used for adjusting an operating temperature of the frequency conversion crystal, where all the heating elements are provided outside of the chamber and where the chamber is stable to baking at 300° C.; and
adjusting a temperature of the frequency conversion crystal to verify an operating temperature of the frequency conversion crystal is within a desired range.

45. A method for producing a laser system, comprising:
providing a mounting fixture and a chamber adapted for holding the mounting fixture;
cleaning the mounting fixture and the chamber;
cleaning at least a surface of a frequency conversion crystal to be protected by the chamber;
assembling the frequency conversion crystal, the mounting fixture and the chamber to define an assembly, providing the chamber with heating elements used for adjusting an operating temperature of the frequency conversion crystal, where all the heating elements are provided outside of the chamber and where the chamber is stable to baking at 300° C.;
sealing the chamber to enclose the surface of the frequency conversion crystal to be protected by the chamber; and
applying a laser beam to the frequency conversion crystal after sealing the chamber.

46. A method for producing a laser system, comprising:
providing a mounting fixture and a chamber adapted for holding the mounting fixture;
cleaning the mounting fixture and the chamber;
cleaning at least a surface of a frequency conversion crystal to be protected by the chamber;
assembling the frequency conversion crystal, the mounting fixture and the chamber to define an assembly;

sealing the chamber to enclose the surface of the frequency conversion crystal to be protected by the chamber, providing the chamber with heating elements for adjusting an operating temperature of the frequency conversion crystal, where all the heating elements are provided outside of the chamber and where the chamber is stable to baking at 300° C.; and aligning the frequency conversion crystal after the step of sealing.

47. The method of claim 46, wherein assembling and sealing the chamber are performed before any alignment of the frequency crystal in the laser system.

48. A method for replacing a frequency conversion crystal in a laser system, comprising:

providing a laser system that uses a frequency conversion crystal to generate light of a converted wavelength;

removing the frequency conversion crystal from the laser system; and installing a new frequency conversion crystal into the laser system, wherein the new frequency conversion crystal has at least one surface maintained in an hermetically sealed environment prior to and throughout installation, wherein the chamber is thermally coupled to heating elements for adjusting an operating temperature of the frequency conversion crystal, where all the heating elements are provided outside of the chamber and where the chamber is stable to baking at 300° C.

49. The method of claim 48, wherein the frequency conversion crystal to be replaced has at least one surface maintained in a hermetically sealed environment defined by a structure and that structure is removed to replace the frequency conversion crystal to be replaced.

50. The method of claim 48, wherein the laser system includes a solid state laser.

51. The method of claim 48, further comprising the step of aligning the frequency conversion crystal with respect to a laser beam.

52. The method of claim 48, further comprising the step of heating the frequency conversion crystal to an operating temperature while aligning the frequency conversion crystal.

* * * * *